May 15, 1928.
E. J. SCHNEIDER
1,669,676
METHOD OF AND APPARATUS FOR MELTING GLASS
Filed Feb. 7, 1923    2 Sheets-Sheet 1
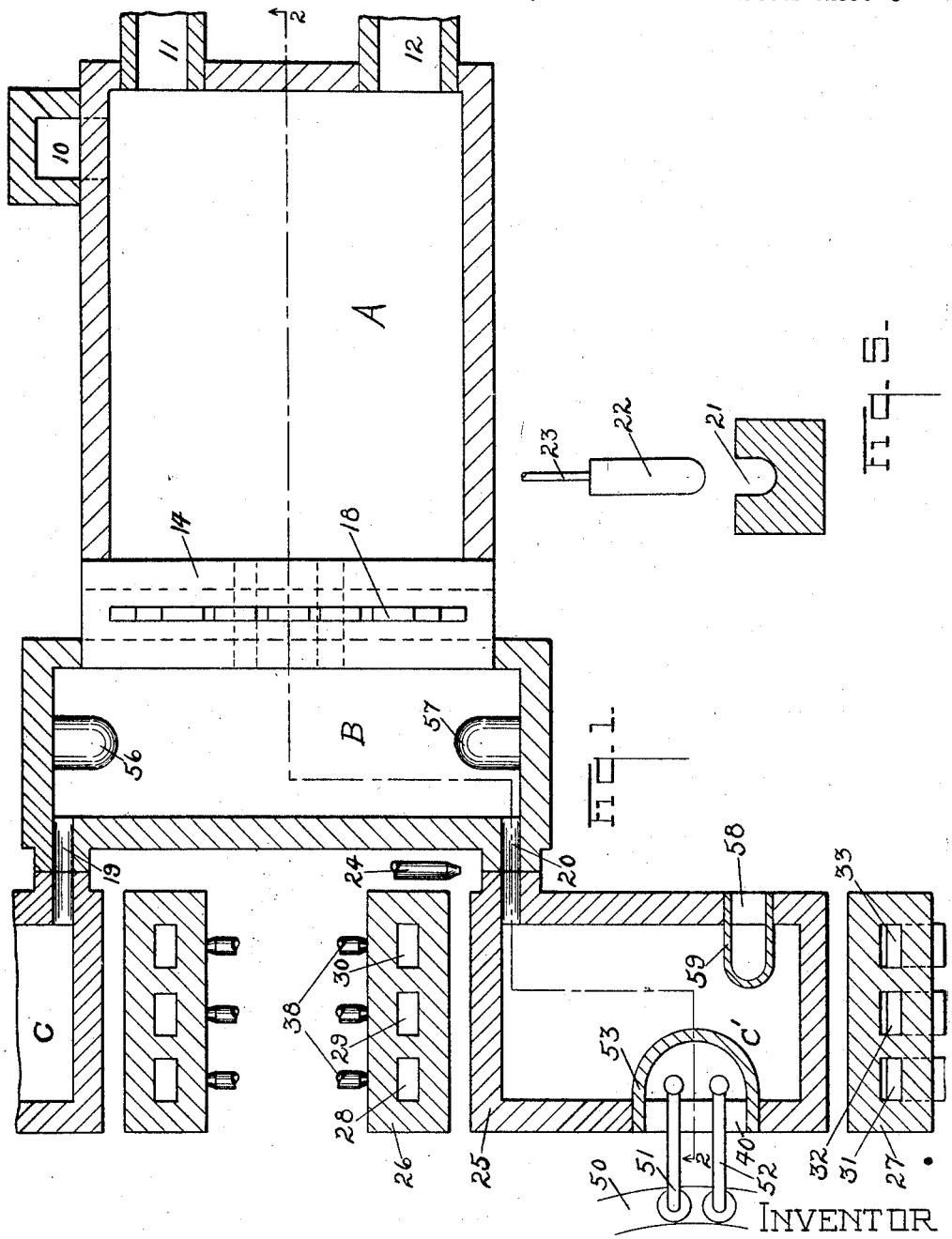

May 15, 1928.
E. J. SCHNEIDER
1,669,676
METHOD OF AND APPARATUS FOR MELTING GLASS
Filed Feb. 7, 1923　　2 Sheets-Sheet 2
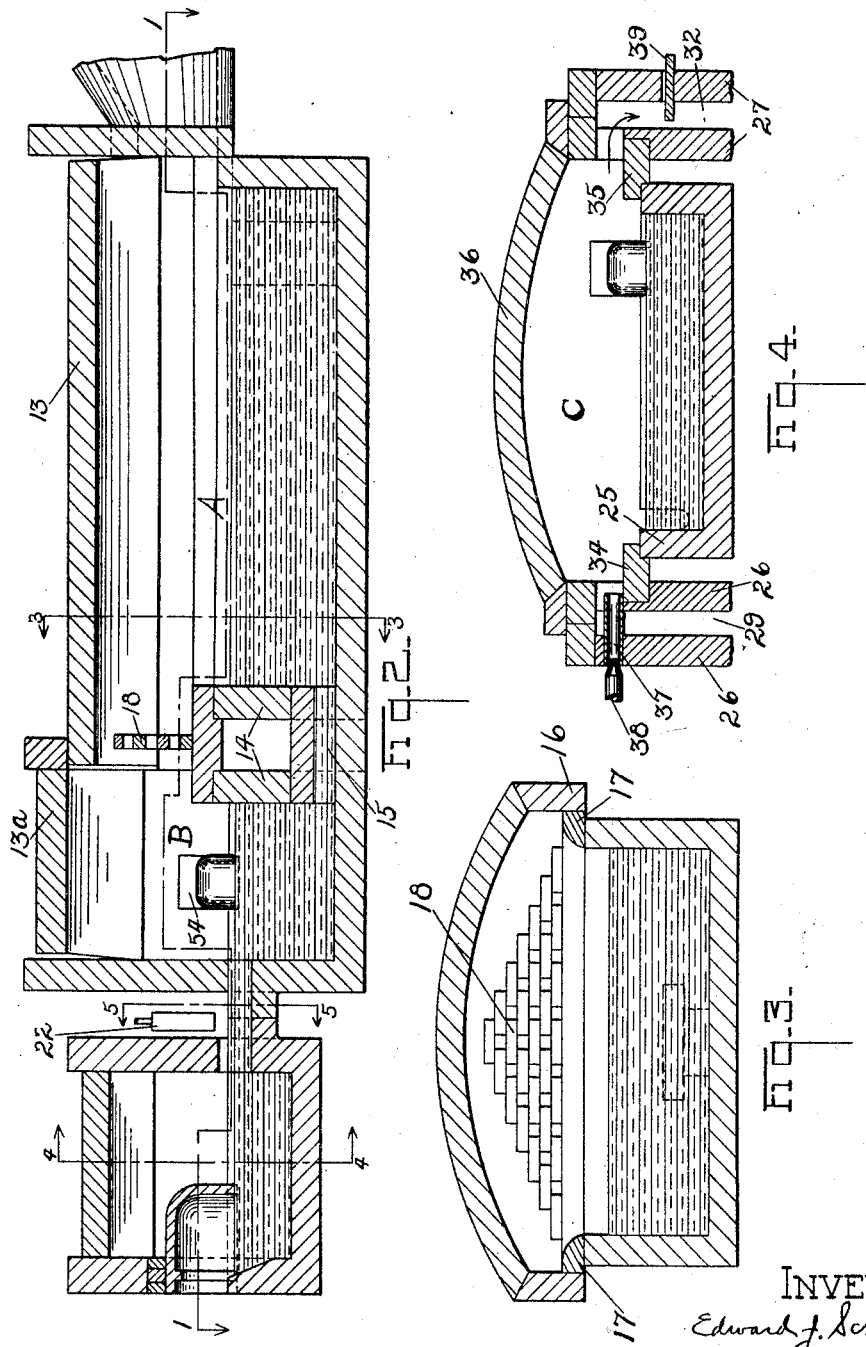
INVENTOR
Edward J. Schneider
By Owen, Owen &
Crampton Patented May 15, 1928.

1,669,676

UNITED STATES PATENT OFFICE.

EDWARD J. SCHNEIDER, OF TOLEDO, OHIO, ASSIGNOR TO THE LIBBEY GLASS MANUFACTURING COMPANY, OF TOLEDO, OHIO, A CORPORATION OF OHIO.

METHOD OF AND APPARATUS FOR MELTING GLASS.

Application filed February 7, 1923. Serial No. 617,583.

My invention relates to a method of and means for maintaining a pool of glass in proper condition for working.

The object of my invention is to maintain such a pool continuously at the desired temperature and of uniform consistency.

The preferred manner of obtaining my object is as follows, reference being had to the accompanying drawings, in which:

Figure 1 is a horizontal section on the line 1—1 of Fig. 2, showing one form of the apparatus used; Fig. 2 is a section on the line 2—2 of Fig. 1; Fig. 3 is a section on the line 3—3 of Fig. 2; Fig. 4 is a section on the line 4—4 of Fig. 2, and Fig. 5 is a section on the line 5—5 of Fig. 2.

In the preferred form of my apparatus, I use a melting tank A, connected to a refining chamber B, to which may be connected one or more gathering chambers C and C'. The melting chamber A may be of any suitable form, but I prefer to construct it, as shown, with a side inlet 10 for the glass making materials and with end ports 11 and 12 for firing. It is preferable to use these flues alternately on the well known regenerative principle. The chambers A and B are covered by roof-arches 13 and 13ᵃ and are separated by a bridge wall 14, through which there is an opening 15, so that the molten glass may flow from the melting chamber to the refining chamber. If preferred, a single continuous arch may be employed to cover both chambers A and B. The roof arches preferably overhang the side walls of the tank, as at 16, and blocks 17 are provided for closing the space between the side walls and the roof arches, as is customary. Above the bridge wall, the space is nearly closed by brick checker work 18, the extent and arrangement of the checker work depending upon the size and manner of use of the tank. From the refining chamber B there are shown outlets 19 and 20, leading, respectively, to the working chambers C and C'. As the chambers C and C' are identical only the chamber C' will be described.

Preferably the spout from the refining chamber to the working chamber is constructed, as shown in detail in Fig. 5, with a channel 21 approximately semi-circular in cross section, and a gate 22, suspended from the cable 23, is provided for shutting off the glass in this spout when desired. If found necessary when starting the flow or at other times, a burner, as indicated diagrammatically at 24, may be used for heating the spout, but ordinarily this burner is not needed. At the ends of the working chamber are shown walls 26 and 27, which extend upward from a flue construction, not shown. The wall 26 has flues 28, 29, 30, while the wall 27 has corresponding flues 31, 32, 33. The space between the wall 26 and the tank wall 25 of the working chamber is closed by blocks 34, and the corresponding space at the other end of the tank is closed by blocks 35. Over the working tank and resting on end walls 26 and 27 is the roof arch 36. In register with the flues 28, 29 and 30 are inlet pipes or tiles 37, through which burners 38 inject fuel into the working chamber. Flues 31, 32 and 33 are controlled by dampers 39.

Air that has been heated in the flue construction beneath the working chamber is drawn up through flues 28, 29 and 30, passing into the working chamber around the inlet pipes 37, and the products of combustion pass out through flues 31, 32 and 33 to the previously mentioned flue construction, where the products of combustion pass through flues adjacent to the flues through which incoming air is drawn, so as to preheat the air in a well known manner. By suitable control of the burners and dampers the temperature in the working chamber may be kept substantially uniform. In the wall of the working chamber C' is shown a gathering opening 40. In cooperative relation with this gathering opening there is indicated, diagrammatically, a gathering and blowing machine 50 having two parallel gathering instruments 51 and 52. Preferably the gathering opening is protected by a hood 53.

I have indicated in the refining chamber openings 54, protected by hoods 56 and 57, and in the working chamber an opening 58, protected by a hood 59.

The operation of the apparatus and the manner of carrying out my process are as follows:

The glass material is fed into the melting tank A in the ordinary manner and the tank is fired through ports 11 and 12 to melt the materials and provide molten glass. The fire is so controlled that the glass in the refining chamber is considerably cooler than the glass in the melting chamber. The end firing is preferred because it facilitates control of the relative heat of the melting and refining chambers. The glass in the refining chamber is kept cooler than the proper gathering temperature, but hot enough so that it will flow sluggishly into the working chamber. The working chamber is fired sufficiently to reheat the refined glass up to proper gathering temperature and the several burners and dampers are controlled to give the desired uniformity of temperature in the working chamber. In this manner, as the cooled glass flows into the working chamber, it forms a zone of sluggish glass in the corner of the chamber at the glass inlet, which gradually heats up and mixes with the glass previously in the working chamber and does not set up a decided current through the working chamber to the gathering point, as is apt to be the case where the glass flows into the working chamber at working temperature or higher. Where such a current of hot glass is set up through the gathering pool, it renders proper control of the temperature at the gathering point difficult, if not impossible. Normally, such a current flows directly to the gathering point, but any deflection of the current will result in a change of temperature at the gathering point, and there are many influences which may cause such deflection. Where the gathering is done by a suction device with two parallel rams, it is especially difficult to prevent deflection of a hot feeding current, and for that reason the temperatures at the two gathering points frequently vary. By my improved method of introducing the glass cooler than that in the working chamber, I avoid this difficulty, because the cooler glass will not flow to the gathering point until it becomes heated up so that it mixes uniformly with the glass previously in the chamber. Where the refining chamber is kept at low temperature a comparatively small chamber suffices. In practice, it has been found that the refining chamber and working chambers together need not occupy more floor space than that previously occupied by the refining chamber alone. I have also found it less difficult to maintain uniform the temperature of the glass in my working chamber than with other well known types of furnaces, due, I believe, partially to the fact that the glass is fed to the working chamber below working temperature and partially to the relatively small quantity of glass in the working chamber. In the preferred form of my apparatus illustrated, I have shown the floor of the working chamber raised above that in the refining and melting chambers in order to reduce the quantity of glass of which it is necessary to accurately control the temperature.

In the normal operation of the device the glass level in the working chamber will be maintained constant by the flow of glass from the refining chamber B, and this manner of operation is preferred, but, if for any reason it becomes necessary, glass may be either poured into or dipped out of the refining chamber through one of the openings 54, or into or out of the working chamber through opening 58. For example, if the gathering apparatus connected with one of the working chambers shown were not to be used for some time it might be desirable to dip glass from that chamber or from the refining chamber so as to continue to use the tank at approximately full capacity, and, under some circumstances, as in case of temporary repairs necessary to the melting and refining tank connected with a working chamber, it might be possible to close the gate between the refining chamber and the working chamber and bring glass to it from some other tank and pour it in through opening 58. In this case, also, the glass may be introduced into the working chamber cooler than proper gathering temperature and allowed to gradually heat up and mix with the glass previously in the chamber.

While two or more gathering machines might be used with one working chamber, I consider the most advantageous arrangement one in which there is a separate working chamber for each gathering machine, though the gathering machine may have parallel gathering devices, as shown diagrammatically in the drawings, and the arrangement is especially suitable for machines such as that shown in the patent granted to August Kadow, April 24, 1917, No. 1,223,393. There will be, of course, one of these machines with each of the working chambers. The arrangement shown, whereby the molten glass enters the middle of the refining chamber near the bottom on one side and flows from the corners on the other side, and thence flows diagonally across the working chamber, is particularly efficient, as it gives the glass the maximum time in each chamber, largely eliminates dead areas, and enables both refining and working chambers to be of minimum size and still retain the glass long enough for proper treatment.

While my process is particularly adapted for gathering by suction from the surface of the pool in the working chamber, and is most advantageous where such gathering is done by a plurality of instruments simultaneously, the manner of controlling the glass in the working chamber so that it will be of uniform and constant consistency is advantageous with other forms of glass forming devices; and many changes may be made in the structure of the apparatus employed, so that I do not wish to confine the invention to the exact features shown, except as stated in the appended claims.

I claim:

1. The process consisting in maintaining a pool of glass at proper working temperature by heat applied to the surface of said pool, separating charges therefrom, and maintaining the supply in the pool by introducing molten glass cooler than proper working temperature.

2. The process consisting in maintaining a pool of molten glass, removing glass from one portion of the pool for shaping operations, maintaining the supply in the pool by introducing, into another portion of the pool, refined molten glass cooler than the glass in the pool, applying heat to the surface of the pool and thereby maintaining its temperature, and maintaining the pool of such size that the cooler glass, by which the supply is maintained, heats up and gradually mixes with glass previously in the pool before it reaches the portion of the pool from which glass is removed.

3. The process consisting in heating a pool of glass to proper gathering temperature by heat applied to the surface of said pool, gathering from the surface of the pool, and maintaining the supply in the pool by introducing molten glass cooler than proper gathering temperature.

4. The process consisting in simultaneously heating a pool of glass to proper gathering temperature by heat applied to the surface of said pool, gathering therefrom, and maintaining the supply in the pool by the introduction of molten glass cooler than proper gathering temperature.

5. The process consisting in heating a pool of glass to maintain it at proper working temperature by heat applied to the surface of said pool, separating charges of glass from the pool at one point, and maintaining the supply in the pool by flowing into it, at a point distant from that from which the charges are separated, glass cooler than that previously in the pool.

6. The process consisting in heating a pool of glass to proper gathering temperature by heat applied to the surface of said pool, gathering from the surface thereof, and maintaining the supply in the pool by flowing into it, at a point distant from where the gathering takes place, glass cooler than proper gathering temperature.

7. The process of maintaining a working pool of molten glass, consisting in introducing into the pool molten glass cooler than a proper working temperature, and heating the pool to maintain it at a proper working temperature while allowing the introduced glass to gradually heat up and mix with that previously in the pool.

8. The process of maintaining a working pool of molten glass, consisting in flowing into the pool glass cooler than a proper working temperature, and heating the pool to maintain it at a proper working temperature while allowing the introduced glass to gradually heat up and mix with that previously in the pool.

9. The process consisting in maintaining a pool of refined molten glass cooler than a proper working temperature, maintaining a working pool at proper working temperature, working glass out of the working pool, and maintaining communication between the two pools, whereby glass from the refined pool will gradually flow into and mix with the glass in the working pool.

10. The process consisting in maintaining a pool of molten glass, removing glass from one portion of the pool for shaping operations, replenishing the glass in the pool by introducing into another portion of the pool refined molten glass, cooler than the glass in the pool, heating the pool from above to maintain its temperature so that the cooler glass introduced therein will gradually heat up and mix with the pool, and maintaining the pool in such a shape that substantially equal amounts of glass lie on opposite sides of a line joining the two said portions, and that the cross section of the pool, perpendicular to said line, decreases as each of said portions is approached.

11. The process consisting in maintaining a pool of glass at proper gathering temperature, gathering from the surface of the pool by suction, and maintaining a supply of refined molten glass at a temperature below that of the pool and in communication with the pool at a point distant from where the gathering takes place, whereby the refined glass slowly flows into the pool towards the gathering point and heats up and mixes with the glass previously in the pool.

12. The process consisting in maintaining a pool of glass at proper gathering temperature, gathering therefrom at a plurality of points simultaneously, and introducing, at a point distant from where gathering takes place, a supply of molten refined glass at a temperature below proper gathering temperature.

13. The process consisting in maintaining a pool of glass at proper gathering temperature, gathering therefrom by suction at a plurality of points simultaneously, and flowing into the pool, at a point distant from where gathering takes place, glass cooler than proper working temperature.

14. The process consisting in maintaining a pool of glass at proper gathering temperature, gathering therefrom by suction at a plurality of points simultaneously, and maintaining a supply of refined molten glass at a temperature below that of the pool and in communication with the pool at a point distant from where gathering takes place, whereby the refined glass slowly flows into the pool, heats up, and mixes with that previously in the pool, to take the place of that removed by gathering.

15. The process consisting in refining glass at a temperature below proper working temperature, heating the refined glass to proper working temperature, and separating mold charges from the reheated glass.

16. The process consisting in refining glass at a temperature below proper gathering temperature, then heating it up to proper gathering temperature, and gathering.

17. The process consisting in melting together glass forming maerials in a melting zone, forwarding the molten glass to a cooler refining zone, flowing the glass from the refining zone to a working zone and raising the temperature of the glass, while it is flowing from the refining zone, above the temperature at which it is refined and separating mold charges from the working zone.

18. The process consisting in melting together glass forming materials, forwarding the molten glass to a refining zone and allowing it to cool to a point below proper gathering temperature, and then gradually advancing it to a gathering zone, and gradually heating it up to proper gathering temperature while so advancing.

19. The process consisting in melting together glass making materials in a melting zone, flowing the molten glass to a cooler refining zone, flowing the refined glass to a hotter gathering zone, and gathering from the surface of the glass in the gathering zone at a plurality of points distant from the point where the cooler refined glass enters the gathering zone.

20. The process consisting in maintaining a pool of glass at proper gathering temperature by heat applied to the surface of said pool, gathering from the surface thereof, maintaining a pool of refined glass at a lower temperature, and maintaining between the pools a surface stream of such size that the glass level will be substantially the same in the two pools.

21. In glass making apparatus, a tank furnace having a refining chamber at one end segregated from the melting end sufficiently so that the glass in the refining chamber may be kept cooler than proper working temperature, there being firing ports only in the end of the tank opposite the refining end, a working chamber in communication with the refining chamber, and means to raise the temperature of the glass in the working chamber.

22. In glass working apparatus, a substantially rectangular tank furnace having a melting chamber in the rear end and a refining chamber in the front end, a bridge wall separating the melting chamber from the refining chamber and having therethrough a central opening, checker work surmounting the bridge wall, firing ports only in the rear wall of the furnace, a working chamber connected to each front corner of the furnace, and separate means for heating each working chamber.

23. In glass working apparatus, a tank furnace having a refining chamber segregated from the melting chamber to such an extent that the glass in the refining chamber may be cooled below proper working temperature, a plurality of working chambers connected to the refining chamber, and separate heating means for each working chamber adapted to raise the temperature of the glass in such chamber.

24. In glass working apparatus, a substantially rectangular working chamber having an inlet opening and a gathering opening, said openings being adjacent corners diagonally opposite each other.

25. In glass working apparatus, a substantially rectangular working chamber having an inlet opening and a gathering opening, said openings being adjacent corners diagoally opposite each other, and means for introducing fuel at one end of the chamber, there being an outlet for the products of combustion at the other end of the chamber.

26. In glass working apparatus, a substantially rectangular working chamber having an inlet opening and a gathering opening, said openings being substatially diagonally opposite each other, and means for introducing fuel above the glass at the inlet end of the chamber, there being outlet ports for the escape of the products of combustion from the gathering end of the chamber.

27. In glass working apparatus, a substantially rectangular working chamber having an inlet opening and a gathering opening, said openings being substantially diagonally opposite each other, a plurality of separately controllable fuel inlets at the entrance end of said chamber, and a plurality of separately controllable flues for the escape of the products of combustion at the gathering end of the chamber.

In testimony whereof, I have hereunto signed my name to this specification.

EDWARD J. SCHNEIDER.